(12) United States Patent
Magnusson et al.

(10) Patent No.: US 6,321,914 B1
(45) Date of Patent: *Nov. 27, 2001

(54) APPARATUS FOR GRADING OBJECTS SUCH AS FISH

(75) Inventors: Ragnar M. Magnusson, Gardabae; Steinar Steinsson, Kopavogi, both of (IS)

(73) Assignee: Style-R. M. Magnusson, Gardabae (IS)

( * ) Notice: Subject to any disclaimer, the term of this patent is extended or adjusted under 35 U.S.C. 154(b) by 0 days.

This patent is subject to a terminal disclaimer.

(21) Appl. No.: 09/403,899
(22) PCT Filed: Apr. 28, 1998
(86) PCT No.: PCT/IS98/00004
  § 371 Date: Dec. 27, 1999
  § 102(e) Date: Dec. 27, 1999
(87) PCT Pub. No.: WO98/48951
  PCT Pub. Date: Nov. 5, 1998

(30) Foreign Application Priority Data

Apr. 28, 1997 (IS) .......................................... 4473

(51) Int. Cl.⁷ ............................... B07B 13/05; B07C 5/06
(52) U.S. Cl. ......................... 209/665; 209/622; 209/668
(58) Field of Search .................... 209/661, 665, 209/666–668, 621, 622, 674, 675

(56) References Cited

U.S. PATENT DOCUMENTS 2,672,647 * 3/1954 Haber ........................................ 17/2

6,065,607 * 5/2000 Magnusson et al. ................ 209/665

OTHER PUBLICATIONS

WO 95/26140 International Application Published under PCT (Oct. 1995 De Vries (pp.4–5)).

WO 96/41541 International Application Published under PCT (27 Dec. 1996 Magnusson (pp. 3–4)).

* cited by examiner

Primary Examiner—Donald P. Walsh
Assistant Examiner—Joseph C Rodriguez
(74) Attorney, Agent, or Firm—Finnegan, Henderson, Farabow, Garrett & Dunner, L.L.P.

(57) ABSTRACT

A grading apparatus, especially for delicate material such as fish. The apparatus consists of a feeding device, ridged belts, rail guides for the transport and grading of material, grading compartments, a driving device and adjustment mechanism. The material to be graded is fed to the feeding device and therefrom onto the ridged belts, which transport it and grade it by thickness into the appropriate grading compartments. The apparatus is unique in that the feed device (4) consists of one or more interconnected and adjustable stages (4a, 4b, 4c). Each stage is equipped with side panels (67) or/and turning pins (55), side panels (67) dividing each stage into one or more channels (70) through which the objects are transported to thereby control the flow direction (77) and the velocity of the objects at each stage and onto the ridged belts (3).

12 Claims, 6 Drawing Sheets

APPARATUS FOR GRADING OBJECTS SUCH AS FISH

TECHNICAL FIELD

The invention concerns an apparatus for grading objects, such as fish, comprising feeding means, ridged belts, rail guides, grading compartments, driving means and adjustment mechanism. The objects are fed onto the feeding means and therefrom onto the ridged belts. The ridged belts being build of numerous units of triangular cross-section fastend to each other in continuous bands. The bands being pulled over the rail guides which determines the distance between the ridged belts so that their distance is greater at the out-feed-end than at the in-feed-end.

BACKGROUND OF THE INVENTION

The grading of objects such as fish and marine species such as capilion and herring can be a problem. The reason being their small size and the volume to be processed at each time combined with that the quality of fish deteriorates quickly if not stored at sub zero temperature. The grading therefore has to be highly efficiently The purpose of the grading is primarily to separate the species by size and/or the sex. Such grading can often result in substantial increases in value as female capilion filled with eggs is much more valuable than the male species. No feasible methods are currently known for such grading.

There are machines, which are capable of grading fish and other objects by size, especially thickness. These include belt and roller machines of various types and shaker graders. The best known, are belt machines, which pull the object between two slanting belts which form a transport channel. These machines frequently have many channels. There are also roller machines where two or more parallel rollers form lanes slanting in the direction of movement of the object. The rollers rotates and the object moves forward. The distance between the rollers is greater at the output end than the input end so that the smallest units of objects are first to fall between the rollers while the larger units fall later. In this way, grading by thickness corresponds to increased distance between the transport belts or rollers. This applies generally to machines based on designs where the distance between lanes is greater at the out-feed end than the in-feed end.

Numerous patents are known which in one way or another attempt to solve this complex problem. U.S. Pat. No. 1,373,812 from 1921, is known which describes a spinning feeding mechanism for grading of sardines. U.S. Pat. No. 2,314,479 from 1943, is known which concerns grading of fish by size and its handling during processing. Norwegian patent, No. 132.917 from 1974, is known which concerns transport and grading, especially of shrimp. British patent, No. 2.140.712A from 1983, is known which concerns grading of plums. PCT patent application No. WO 88/06495 from 1988 is known, which concerns grading of shrimp and related materials. U.S. Pat. No. 4,723,660 from 1988 concerns apparatus for transport and grading of material. U.S. Pat. No. 2,547,473 from 1951 is known concerning grading of fruit by size. Another U.S. Pat. No. 1,251,093 from 1917 concerns grading of fruit and vegetables. Another U.S. Pat. No. 1,204,685 is known concerning grading of fruit and a packaging bench. Another U.S. Pat. No. 1,178,006 concerns grading of fruit and vegetables. Finally, PCT application from the present applicant from 1996 concerns a method and apparatus for grading of fish and other materials by size.

DISADVANTAGES OF PRIOR ART

Because of the quantity of material to be processed at each time, as in the case for capilion processing, steady feeding to the grading apparatus has been a problem. The main problem has been to arrange the material into a single layer in optimal position onto the grading apparatus. If this is not accomplished, small fish may be carried on top of a larger fish into a wrong grading compartment. The advantages of using ridged belts against grading by weight have not been fully utilised. Various species of fish have characteristic features. The male capilion, for instance, has during the egg-laying season hair-brushes on its sides. The eyes of certain types of red-fish props out when taken from large sea depth and high pressure, to mention some of the characteristics that can be used for grading by criteria other than weight. By utilising these characteristics of the species concerned their grading can be simplified and thereby their value increased substantially. None of the patents referred to above ad dress these characteristic features or show how they can be used.

SUMMARY OF THE INVENTION

The purpose of the invention is to present apparatus for grading of material, especially delicate material such as fish. The apparatus consists of a feeding mechanism, ridged belt and rail guides for the transport and grading of material, grading compartments, drive mechanism and adjustment mechanism. The material to be graded is fed into the feeding mechanism so that the material can be fed into the ridged belts in the optimum position and at the same speed as the transport speed of the ridged belts, which transport it and grade it by thickness into the appropriate grading compartments. The ridged belts are composed of numerous units with a triangular cross-section and connected into a continuous band which is pulled over the rail guides. The orientation of the rail guides, and thereby the ridged belts, is determined so that the distance between them is greater at the outer end than at the inner end. In addition, the ridged belts can be used to grade material with specific features or shape which can be utilised in addition to the thickness grading.

BRIEF DESCRIPTION OF THE DRAWINGS

The invention can be described in greater detail by referring to the attached drawings where.

DESCRIPTION OF THE INVENTION IN GREATER DETAIL

The purpose of the invention is attained by the apparatus's unique features in that the feeding means, comprising one or more interconnected and adjustable stage, each stage being equipped with guiding plates or/and turning pins, the guiding plates dividing each stage into one or more channel through which the objects are transported and thereby controlling the flow direction and the velocity of the objects at each stage and onto the rigid belts, which transport and grades the objects according to thickness into the appropriate grading compartments.

The apparatus is also unique in that the guides or guiding plates are perpendicular to the bottom area of individual feeding stages and parallel to the flow direction of the material. The number of guiding plates is smallest in the in-feed stage and greatest in the out-feed stage.

Furthermore, the inclination of the feeding stages is adjusted so that the flow rate of the objects in the out-feed stage is substantially the same as the velocity of the ridged belts. The inclination of individual feeding stages is so adjusted that the objects are fed onto the rigid belts in nearly single layer in an optimal position.

In addition, the turning pins extending from the lower edge of the feeding stages and curved upwards to form up to 90° angle to the bottom area of the feeding stages. The maximum number of turning pins is equal to the number of ridged belts. Further the turning pins are positioned either at the bottom or top of the furrows.

In addition the rigid belts are equipped with guiding plates which are positioned above and parallel to the rigid belts. Also the distance between the ridged belts is adjusted so that it increases approximately by an elliptical curve from the out-feed end to the in-feed end of the ridged belts. Moreover the panel sides of the ridged-belt units feature elevated furrows extending approximately perpendicular to the direction of movement of the ridged belts. Also the ridged belts are upwardly inclined in the direction of movement of the belt.

Moreover the inclination of the ridged belts is approximately −3° to 25 in the direction of movement. At last the slant of the ridged belts is approximately 4–8°, more specifically 5–7° in the direction of movement.

Figure 1:
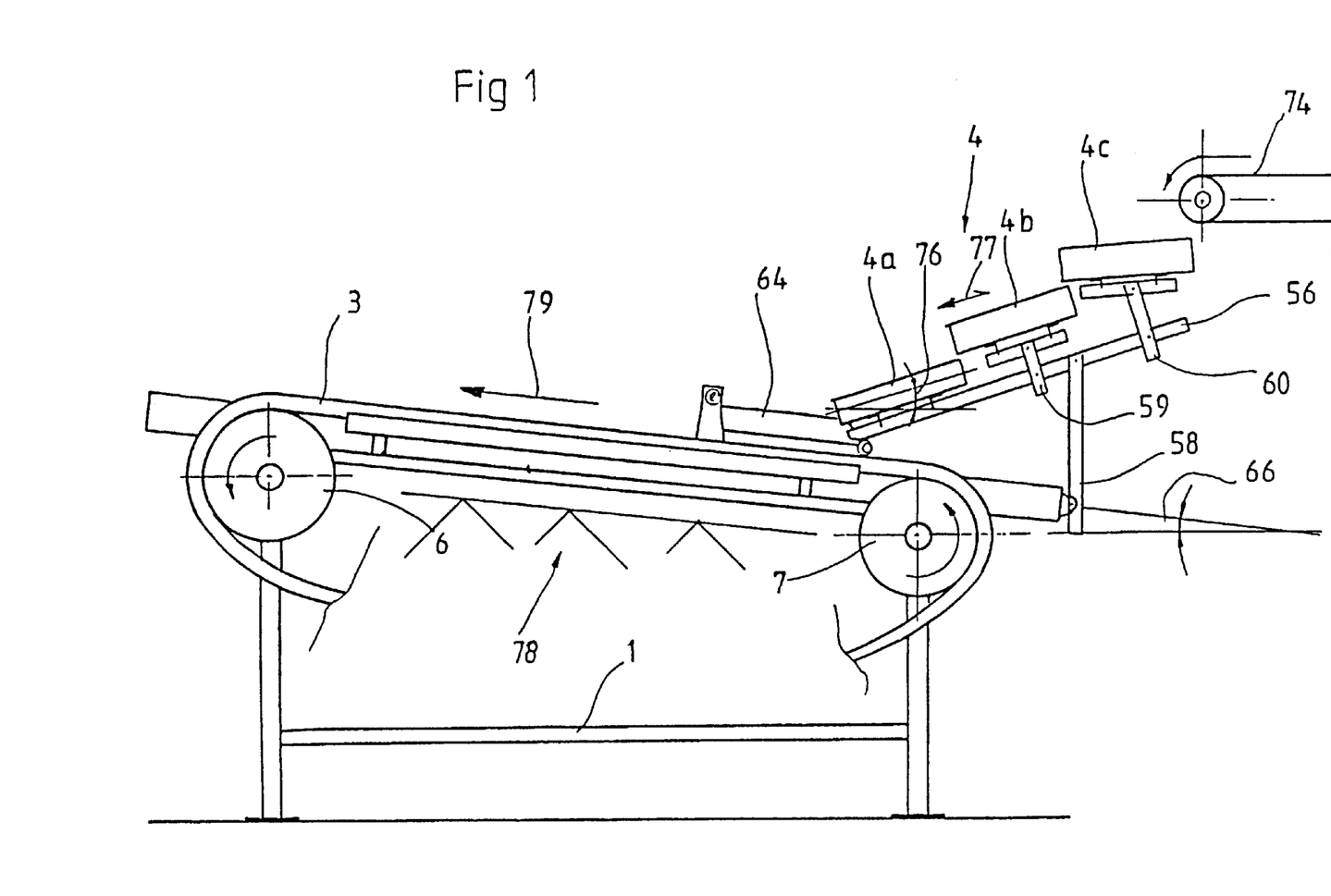
FIG. 1 shows a lateral view of the grading apparatus.
Figure 2:
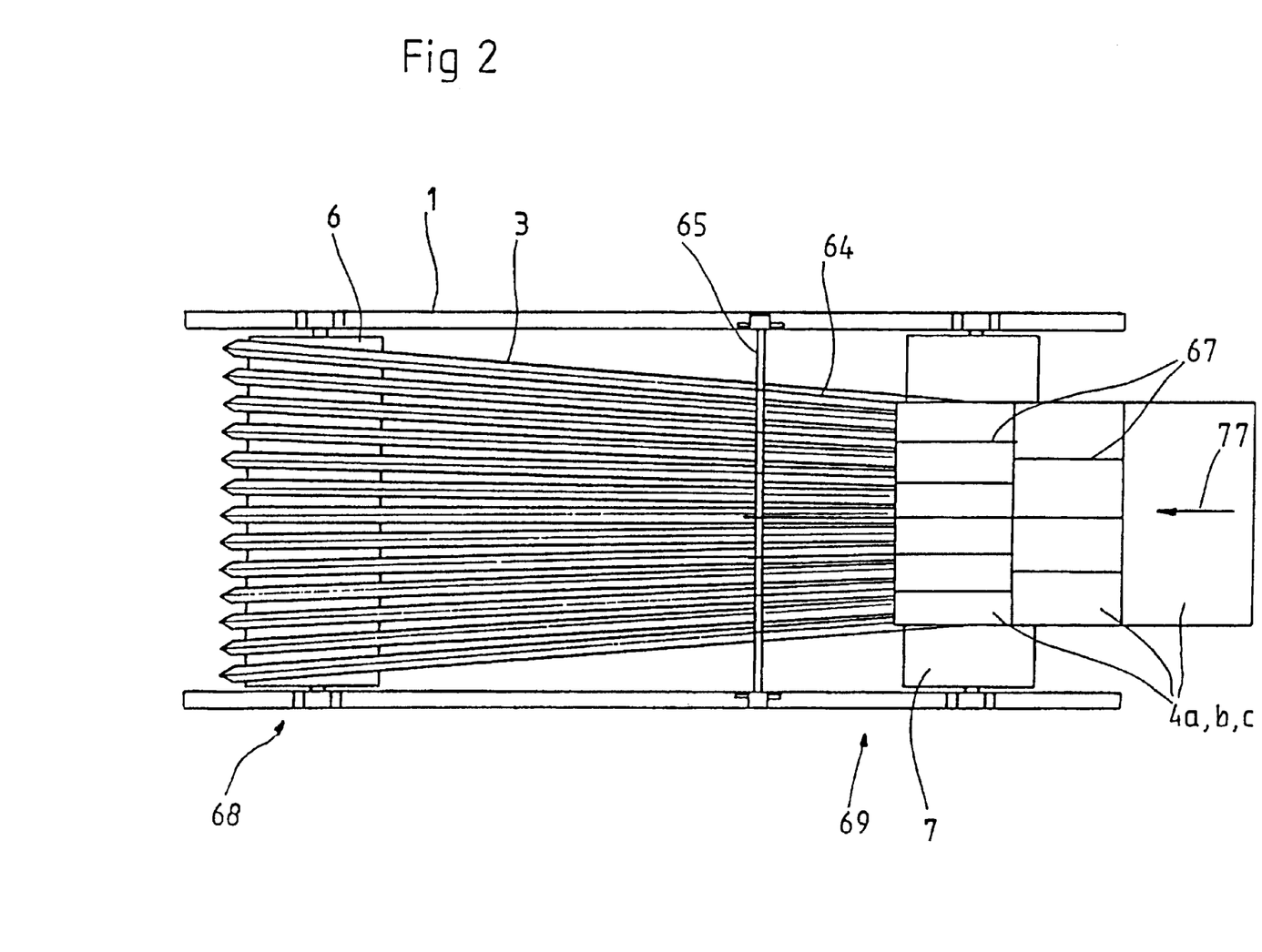
FIG. 2 shows a top view of the grading apparatus.

FIG. 1 shows a lateral view of the grading apparatus. FIG. 2 shows a top view of the same apparatus. The material to be graded is transported to the apparatus, e.g., with a conveyor belt (74) as shown on the illustration. From the conveyor belt it falls down to the first feeding stage (4c) of the feeding apparatus (4). The illustration shows three feeding stages (4c, 4b, 4a) each following the other. There can be more or fewer stages. The slant (76) of the stages can vary and is adjustable for each stage. The stages are adjusted and supported by a special framework (56, 58, 59, 60). The framework can stand independently of the supporting framework (1) of the grading machine itself. When the material falls off the final stage it falls down to the ridged belts (3) of the grading apparatus. The ridged belts (3) are pulled by a drum-shaped driving mechanism (6,7) at either end of the apparatus. At the front end (the in-feed end) of the apparatus there is a special stacking mechanism consisting of vertical guiding plates (64) extending above and parallel to the top edges of the ridged belts. The purpose of the stacking mechanism is to ensure still further the arrangement of the material into a single layer onto the ridged belts. In order to improve the grading, it is possible to tilt the ridged belts by −5° to +25° depending on the material being graded.

Figure 3:
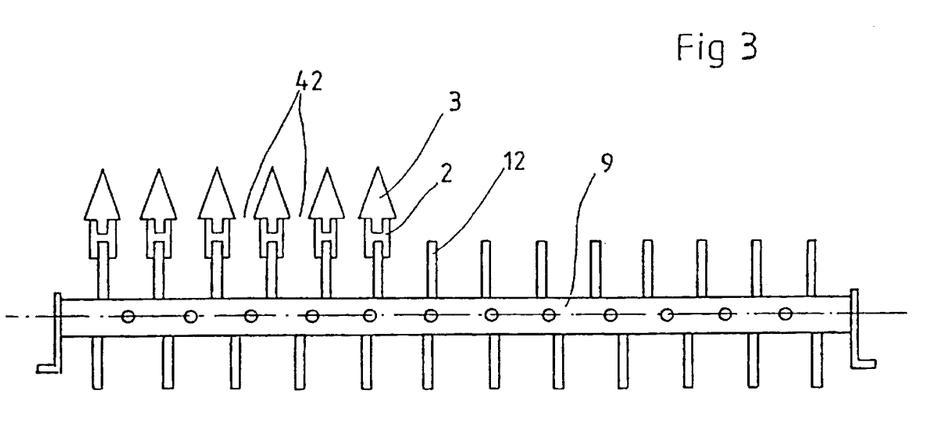
FIG. 3 shows the details of the ridged belts.

FIG. 3 shows the arrangement of the ridged belts (3). The ridged belts (3) are seated and slide in the so-called ridged-belt rail guides (2). The aspect of the ridged belts (3) and rail guides (2) are determined by the orientation of the adjustment pins (12) and the adjustment bar (9). The adjustment bar extends across the apparatus, and three such bars support the ridged-belt guides and the ridged belts. Each bar (9) is fitted with up to four rows of adjustment pins (12). Each row of adjustment pins has a predetermined distance between individual pins. By turning the bar (9) by 90° and attaching a new row of adjustment pins to the ridge-band guides the distance (42) between the ridge bands (3) can be increased.

Figure 4:
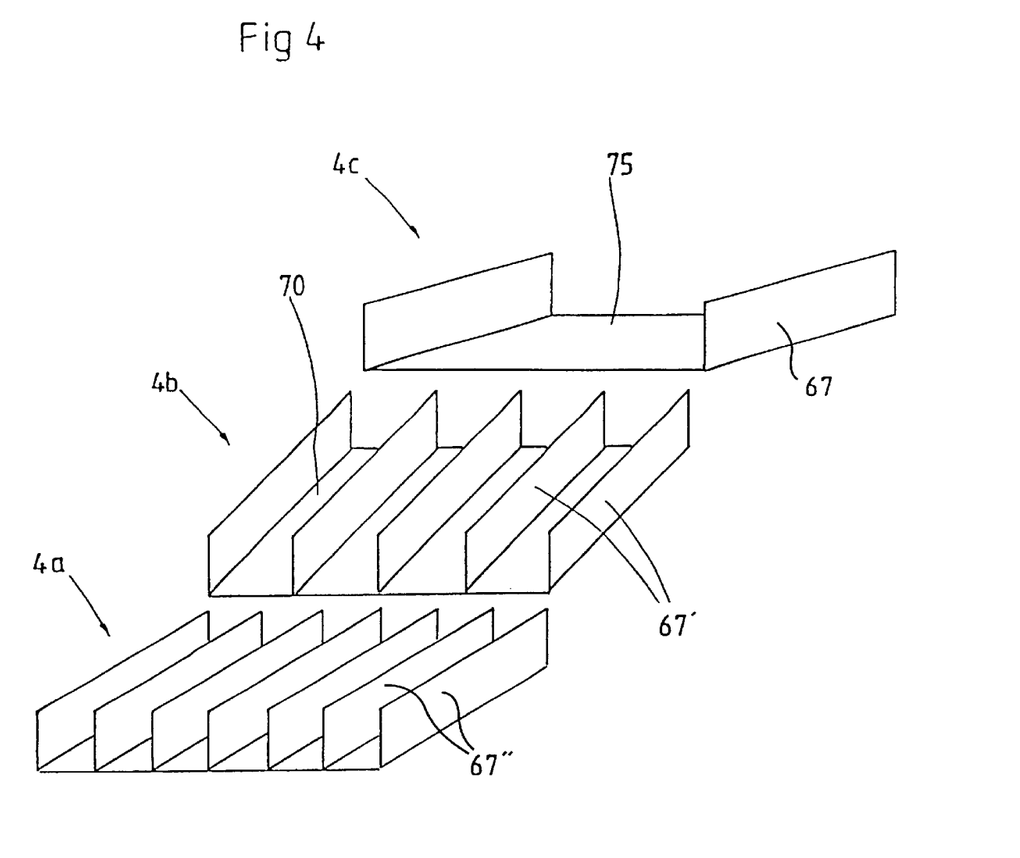
FIG. 4 shows the details of the feeding chute.

FIG. 4 shows one version of the feeding mechanism. Three stages, 4a, 4b, and 4c, are shown. The highest stage has two side panels (67) which form a single chute. The next stage has 5 side panels (67') that form 4 chutes (70). The lowest stage (4a) has 7 side panels (67") which form 6 chutes. The stages can be slanted in different directions depending on the material being graded. When a fish lying across the direction of movement falls from the first stage (4c) and lands on the panels (67') of the second stage (4b), the heavier end will seek to enter the chute first and the fish will be turned. This is repeated between stages two and three so that a fish emerging from the last stage will always face the correct direction. From the smooth surface of the top stage (75) which may be wetted by sprinkling with water, the material will slide to the next stage. The side panels form box-like chutes or channels (70). Their width is somewhat less than the length of the material, which enforces turning of the material so that its longer axis will turn in the same direction as the direction of motion of the belts. The number of stages may be increased as well as the number of panels thus narrowing each chute (70).

Figure 5:
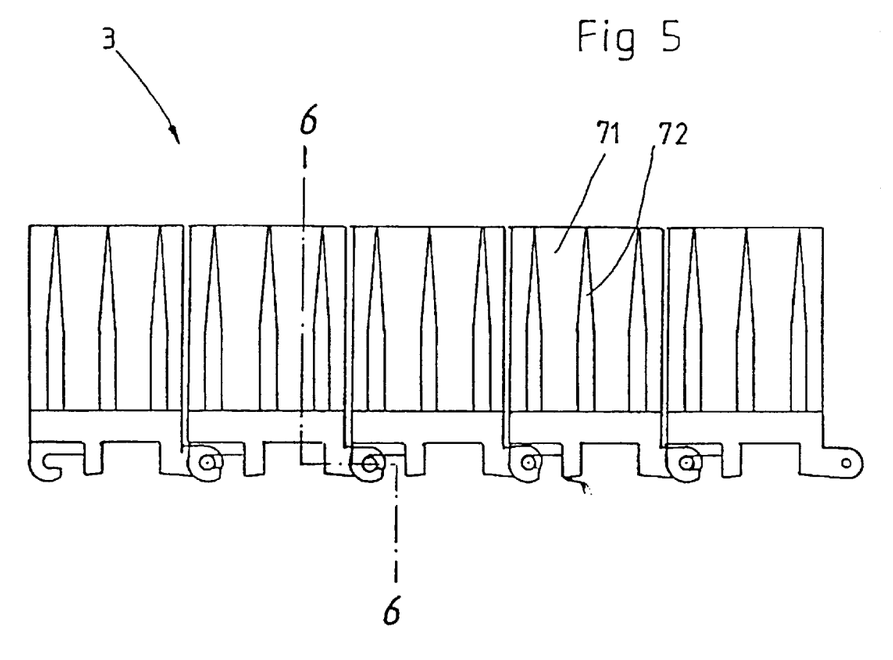
FIG. 5 shows a lateral view of an alternative version of the ridged belts.
Figure 6:
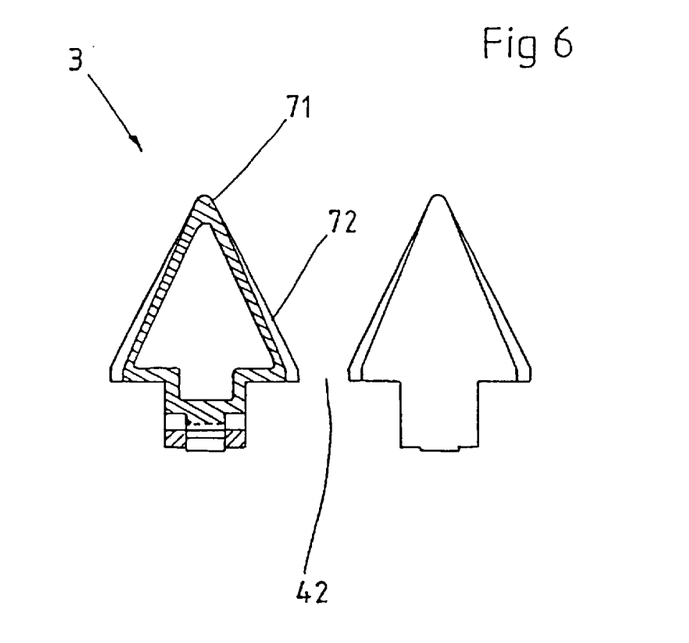
FIG. 6 is a cross-sectional view taken along the line 6—6 of FIG. 5 and showing the design of the ridged belts, FIGS. 7(a), (b), and (c) show the placement of the turning pins in the feeding apparatus.

FIGS. 5 and 6 show an alternative version of the ridged belts (3). The side panels (71) are partly raised. The smooth side panel is covered with a waved pattern.

This makes it possible to, grade material by thickness even if some parts of the material protrude. This applies e.g., red-fish, which has extremely protruding eyes when it emerges from the fishing gear of fishing vessels. This feature makes it possible to grade red-fish by thickness (size) without the grading being affected by the protruding eyes. The eyes fit into the gaps between the waves (72) while the body of the fish is flush with the waves (72). Thus, it is in fact the distance (42) between the tops of the ridges parallel to the ridged belts which determines the grading.

Figure 7A:
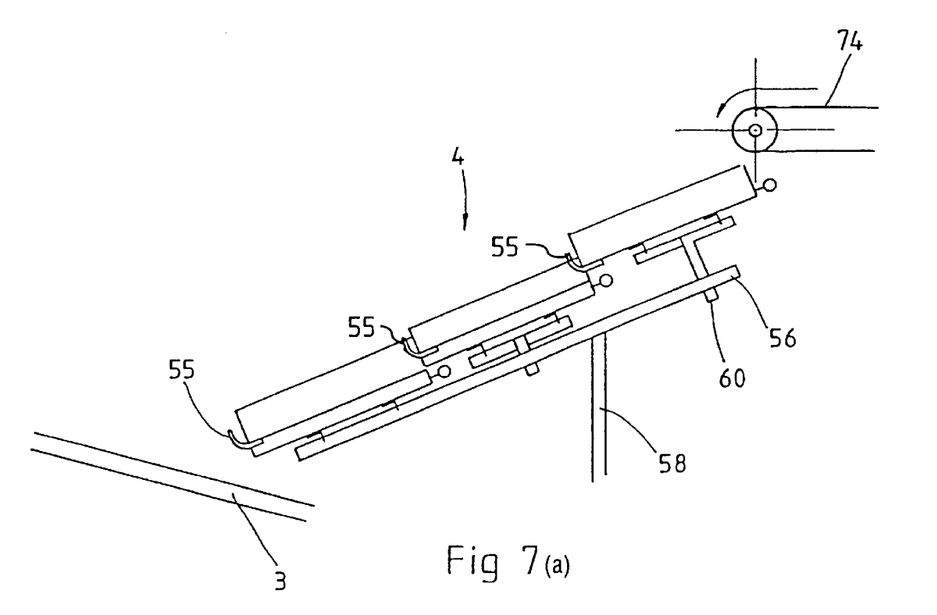
Figure 7B:
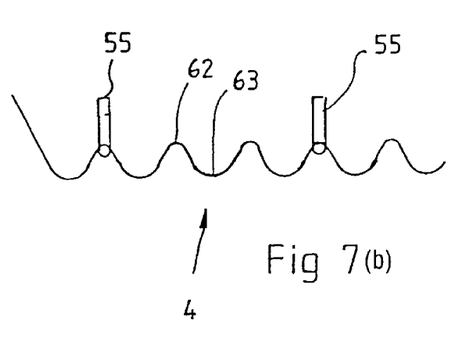
Figure 7C:
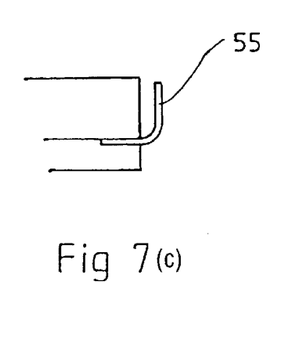

FIG. 7(a) shows the feeding stages (4) with turning pins (55) at the outer end of the feeding stages. The stages in this version as shown in FIG. 7(b) have a corrugated bottom. The turning pins (55) are either at the top (62) of each corrugation as shown in FIGS. 7(b) and (c) or at the bottom. When a fish lands across the direction of movement and lands on the pins, it is turned and is aligned correctly in one of the corrugations of the next stage.

Figure 8:
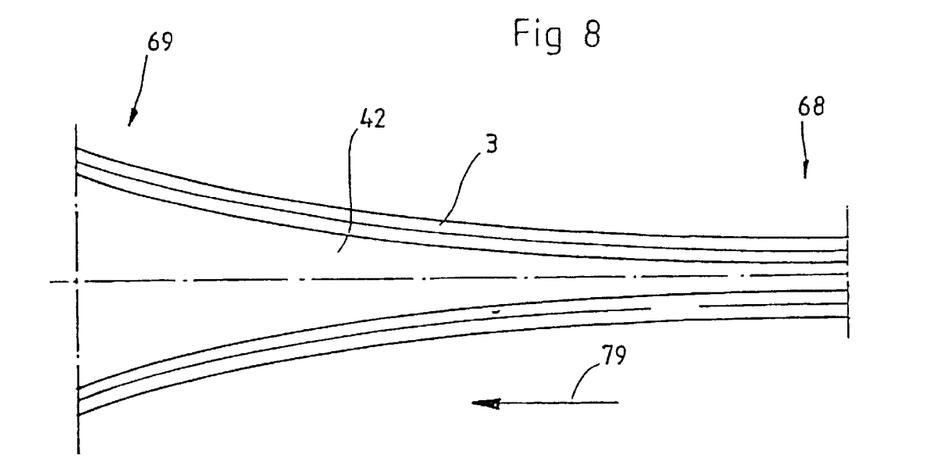
FIG. 8 shows yet a further version of the arrangement of the ridged belts with gradually increasing distance between them.

FIG. 8 shows another version of the ridged belts where the distance (42) between two adjacent ridged belts (3) increases in an elliptical curve so that the distance is much greater at the outer end (69) than the inner end (68). By using three supporting bars (9) as shown in FIG. 3, the adjustment options of the grading slit are increased. With the correct distribution of each support bar, the direction of the rail guide can be curved so that the initial part of the grading slit can be narrow with increasing distance for each unit of length.

The invention described here above is not limited to precisely those details which have been specified, but can be elaborated upon in many ways without deviating from the central concept and spirit of the invention as defined in the patent claims below.

What is claimed is:

1. In an apparatus for grading objects having feeding means, ridged belts, rail guides, grading compartments, and driving means, where the objects are fed onto the feeding means and from there onto the ridged belts, the ridged belts being formed from numerous units of triangular cross-section fastened to each other in continuous belts, the belts being pulled by the driving means over the rail guides which determines the distance between the ridged belts so that the distance is greater at an out-feed end than at an in-feed end of the ridged belts, the improvement wherein the feeding means comprises     a plurality of interconnected and adjustable feeding stages, each stage being equipped with side panels that divide each stage into one or more channels through which the objects are transported to thereby control the direction of flow of the objects and the velocity of the objects at each stage and onto the ridged belts which transport and grade the objects according to thickness into appropriate grading compartments, wherein said side panels are perpendicular to a bottom area of each individual feeding stage and parallel to the direction of flow of the objects and the number of side panels is the smallest at an in-feed stage at an in-feed end of the feeding means and greatest at an out-feed stage at an out-feed end of the feeding means,     and wherein sides of the ridged-belt units have elevated waves extending approximately perpendicular to a direction of movement of the ridged belts from the in-feed end to the out-feed end thereof.

2. The apparatus of claim 1, wherein the feeding stages are inclined and the inclination of the feeding stages is adjusted so that the velocity of the objects at the out-feed stage is substantially the same as the velocity of the ridged belts.

3. The apparatus of claim 1, wherein the feeding stages are inclined and the inclination of individual feeding stages is adjusted so that the objects are fed onto the ridged belts in nearly a single layer.

4. The apparatus of claim 1, including turning pins extending from a lower edge of each of the feeding stages that curve upwards to form a 90° angle with respect to the bottom area of the feeding stages.

5. The apparatus of claim 1, including guiding plates positioned above and parallel to the ridged belts at the in-feed end of the ridged belts.

6. The apparatus of claim 1, wherein the distance between the ridged belts is adjustable so that the distance increases approximately by an elliptical curve from the in-feed end to the out-feed end of the ridged belts.

7. The apparatus of claim 1, wherein the ridged belts incline upwardly in a direction of movement of the ridged belts from the in-feed end to the out-feed end thereof.

8. The apparatus of claim 7, wherein inclination of the ridged belts is approximately −3 to 25° in the direction of movement relative to a horizontal plane.

9. The apparatus of claim 8, wherein the inclination of the ridged belts is approximately 4–80.

10. The apparatus of claim 9, wherein the inclination of the ridged belts is from 5–70.

11. The apparatus of claim 4, wherein the maximum number of turning pins is equal to the number of ridged belts.

12. The apparatus of claim 4, wherein the bottom areas of the feeding stages are corrugated and the turning pins are positioned either at a bottom or top of each corrugation.

\* \* \* \* \*

UNITED STATES PATENT AND TRADEMARK OFFICE
CERTIFICATE OF CORRECTION

PATENT NO. : 6,321,914 B1
DATED : November 27, 2001
INVENTOR(S) : Ragnar M. Magnusson and Steiner Steinsson It is certified that error appears in the above-identified patent and that said Letters Patent is hereby corrected as shown below:

<u>Title page,</u>
Item [57], Inventors, "Kopavogi, both of" should read -- Kopavogi; Egill Thor Ragnarsson, Kopavogur, all of --.

<u>Column 6,</u>
Line 21, "4-80" should read -- $4\text{-}8^{\circ}$ --.
Line 23, "5-70" should read -- $5\text{-}7^{\circ}$ --.

Signed and Sealed this

Thirtieth Day of July, 2002

*Attest:*

*Attesting Officer*

JAMES E. ROGAN
*Director of the United States Patent and Trademark Office*